DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 8, 1970

878 O.G. 240

T878,006
PHOTOGRAPHIC DIFFUSION TRANSFER PRODUCT AND PROCESS

Walter J. Weyerts, Kodak Park, Rochester, N.Y. 14650

Filed Jan. 14, 1970, Ser. No. 2,933
Int. Cl. G03c *1/48, 5/54*
U.S. Cl. 96—29
No Drawing. 17 Pages Specification

A substantially protein free receiving layer for use in a photographic diffusion transfer process comprises silver precipitants and a colloid binder comprising from about 50 to about 95% by weight polyvinyl alcohol based on the total binder and from 5 to about 50% sulfonated aromatic polymer, such as a sulfonated polysytrene or a salt of a sulfonated polymer. The layer can also contain toning and/or processing compounds. The layer is typically coated on a support and used in the silver salt photographic diffusion transfer process to provide an image in the receiving layer on a support.